Aug. 2, 1966  C. V. BLIVEN  3,263,983
SHOCK ABSORBER AND AUXILIARY SPRING UNIT
Filed Dec. 30, 1963  2 Sheets-Sheet 2

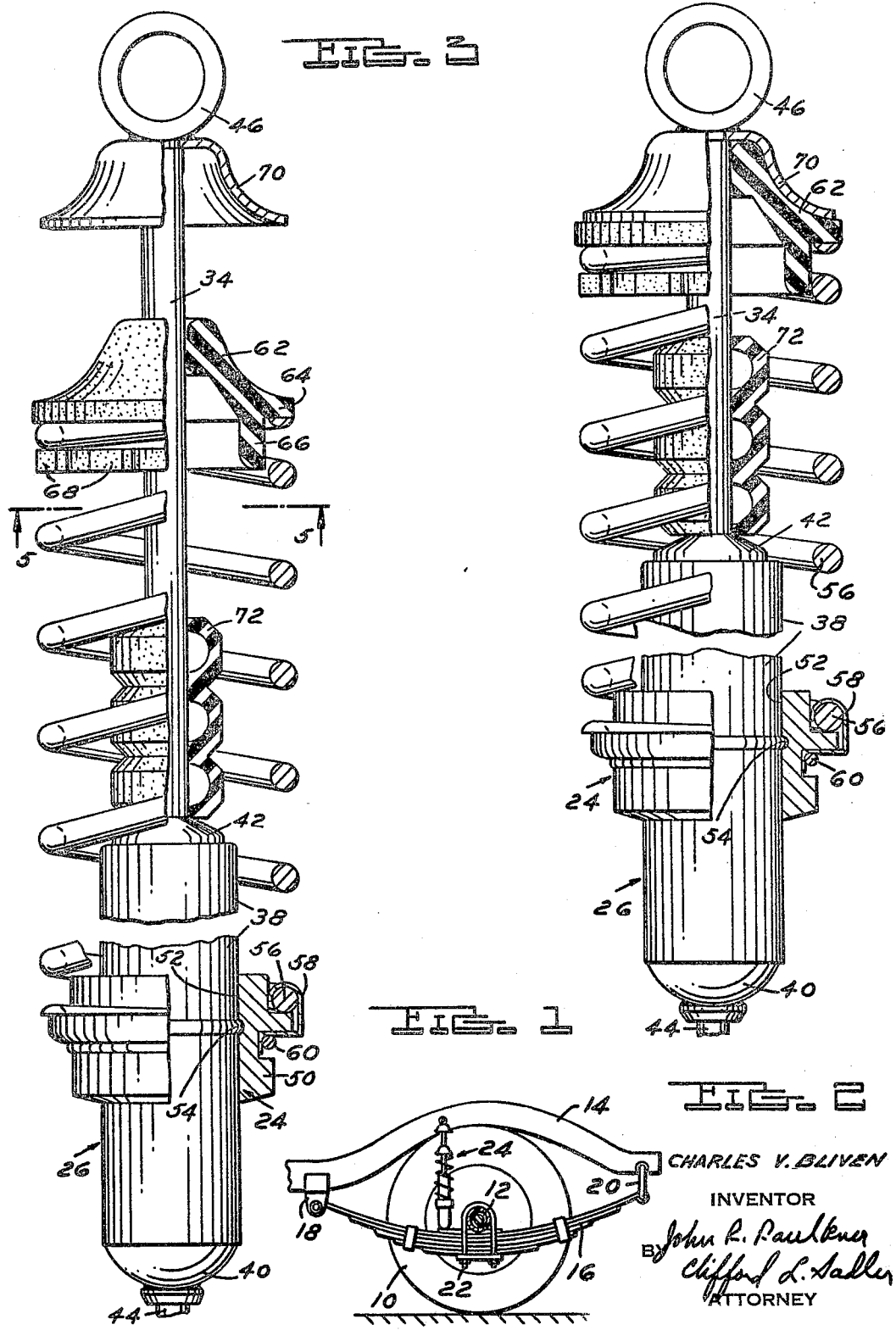

CHARLES V. BLIVEN
INVENTOR
John R. Faulkner
BY Clifford L. Sadler
ATTORNEY

United States Patent Office 3,263,983
Patented August 2, 1966

3,263,983
SHOCK ABSORBER AND AUXILIARY
SPRING UNIT
Charles V. Bliven, Wayne, Mich., assignor to Ford Motor
Company, Dearborn, Mich., a corporation of Delaware
Filed Dec. 30, 1963, Ser. No. 334,499
4 Claims. (Cl. 267—8)

The present invention relates to vehicle suspension systems, and more particularly to that class of suspension devices used to supplement a vehicle's main suspension spring.

Basically, a vehicle suspension comprises a wheel and its support member, a vehicle chassis, and a main suspension spring that resiliently supports the chassis on the wheel support member. It has become customary for automotive designers to provide main suspension springs with a low spring rate so that the vehicle will have a soft or boulevard ride.

On certain occasions, an automotive user may wish to place a greater than normal load upon the vehicle causing the soft suspension springs to be fully deflected and the suspension to "bottom out" when the wheels strike a bump in the road. In addition, vehicles that are several years old may experience spring sag with the same bottoming out results.

In order to control or limit extreme jounce deflection of a vehicle suspension, according to the present invention a combination shock absorber and supplemental spring unit is provided that resiliently supports a portion of the vehicle's sprung mass when the suspension is at its design height. The unit provides additional spring support to accommodate greater than normal vehicle loading or to replace spring support that has been lost by the aging of the main suspension springs.

In the presently preferred embodiment, this invention may comprise a telescopic shock absorber of the direct acting type having a surrounding coil spring with its lower end secured to the outer tube of the shock absorber and its upper end guided by a rubber retainer or spring seat. The rubber spring seat is in sliding contact with the shock absorber's piston rod and spaced from an abutting element at the end of the piston rod when the suspension is in a rebound position. The supplemental coil spring carries a load only when the vehicle is at, or lower than, its design height.

The many objects and advantages of this invention will be fully comprehended from the following discussion and the accompanying drawings in which:

FIGURE 1 is a side elevational view of a vehicle suspension incorporating a presently preferred embodiment of this invention;

FIGURE 2 is an elevational view partly in section of the shock absorber and supplemental spring unit disclosed in FIGURE 1 with the various components shown at the design height;

FIGURE 3 is an elevational view, partly in section, of the unit disclosed in FIGURE 2 with the shock absorber disclosed in an extreme rebound position;

Figure 5:
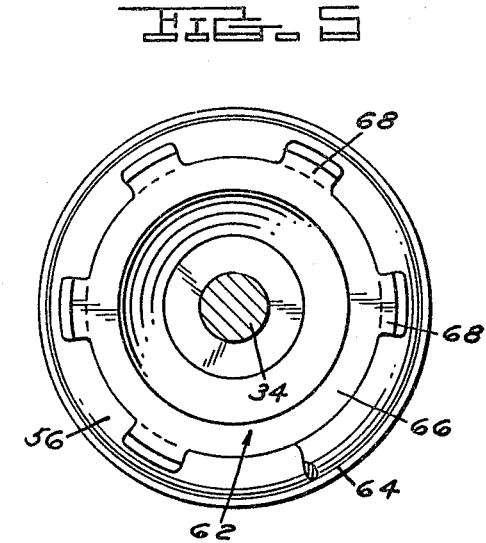
FIGURE 5 is a sectional view taken along section lines 5—5 of FIGURE 3.

Referring now to the drawings, FIGURE 1 discloses a portion of a vehicle suspension system having a wheel 10 rotatably supported by an axle housing 12. A vehicle chassis, which includes a frame side rail 14, is supported on the axle housing 12 by a leaf spring 16. The leaf spring 16 has its forward end pivotally connected to a frame bracket 18. The rear end of the spring 16 is connected to the frame 14 by a shackle 20. A U-bolt 22 rigidly connects the axle housing to the center portion of the leaf spring 16. The sprung mass of the vehicle, which includes the frame portion 14, is resiliently supported on the unsprung components (the axle housing 12 and wheel 10) by the leaf spring 16.

The spring 16 has a low spring rate so that the vehicle will have a soft ride under the majority of operating conditions. If the vehicle user decides to place an excessive load on the vehicle, the spring 16 will deflect to an extreme position with the frame member 14 moving downwardly toward the axle 12. In order to support the frame 14 at its proper position under excessive loadings, a shock absorber and supplemental spring unit 24 is interposed between the frame member 14 and a bracket connected to the axle housing 12. The unit 24 may replace the suspension's regular shock absorbers.

Reference is now made to the other figures of the drawings for a complete description of the shock absorber and supplemental spring unit 24. The unit 24 comprises a direct acting telescopic shock absorber 26 that has an inner pressure tube 28. The lower ends of the pressure tube 28 are sealed by a foot valve assembly 30 that may be of the type disclosed in Patent 2,138,513. A piston assembly 32 is slidably disposed in the pressure tube 28 and contains jounce and rebound valves. The piston 32 may have a construction such as disclosed in the same patent.

A piston rod 34 threadedly engages the piston assembly 32 and extends upwardly out of the upper end of the pressure tube 28. A closure member 36 is in sliding sealed engagement with the piston rod 34 and closes the upper end of the pressure tube 28.

A reservoir tube 38 surrounds the pressure tube 28 and defines a reservoir chamber of annular configuration therewith. A cup-shaped member 40 closes the lower end of the reservoir tube 38.

The valving of the foot valve 30 provides controlled communication between the jounce chamber situated beneath the piston 32 and the annular chamber of the reservoir tube 38. The upper closure member 36 positions the reservoir tube 38 which, in turn, is sealed at its upper end by a closure member 42. A threaded mounting member 44 is welded to the bottom member 40 of the shock absorber 26 for attachment to an unsprung suspension component. A ring 46 is welded to the upper end of the piston rod 34 for attachment to a reinforced sprung component such as frame member 14.

The reservoir tube 38 is formed with a circumferential rib or ridge 48. A spring seat comprising a pair of semicircular members 50 having a cylindrical inner wall 52 is clamped about the reservoir tube 38. The walls 52 are formed with a groove 54 that engages the ridge 48. A coil spring 56 is positioned concentric about the shock absorber 26 and has its lower end encircling a portion of spring seats 50. A pair of spring metal clips 58 secure the last coil of the springs 56 to the spring seat and they, in turn, are held in place by a snap ring 60. Thus, the two spring seat parts 50, the lower end of the coil spring 56 and the shock absorber reservoir tube 38 are held in rigid assembly by the clips 58 and the snap ring 60.

A cup-shaped rubber member 62 is concentrically disposed about and slidably engages the piston rod 34. The member 62 serves as a retainer for the upper end of the coil spring 56. It is provided with a radial flange 64 that receives the upper coil of spring 56. A cylindrical flange 66 is positioned within the coil spring 56 and has radial tabs 68 that hold the final coil in engagement with the retainer 62.

A sheet metal cup 70 is welded to the upper end of the piston rod 30 and has an internal configuration complementing the shape of the rubber spring retainer 62. Cup 70 functions as a stop or abutment member as will be described later.

FIGURE 2 illustrates the several components of the shock absorber and supplemental spring unit 24 as they are located when the vehicle is at its design height. In this position, the coil spring 56 is lightly loaded. As FIGURE 3 indicates, when the piston rod 34 is extended and the shock absorber 26 is in a rebound position, the coil spring 56 is in an unloaded condition. The spring 56 is not secured to the piston rod 34, but is only in sliding contact by means of its retainer 62. It is provided in such a length as to be only loaded when the vehicle is at its design height or lower.

Figure 4:
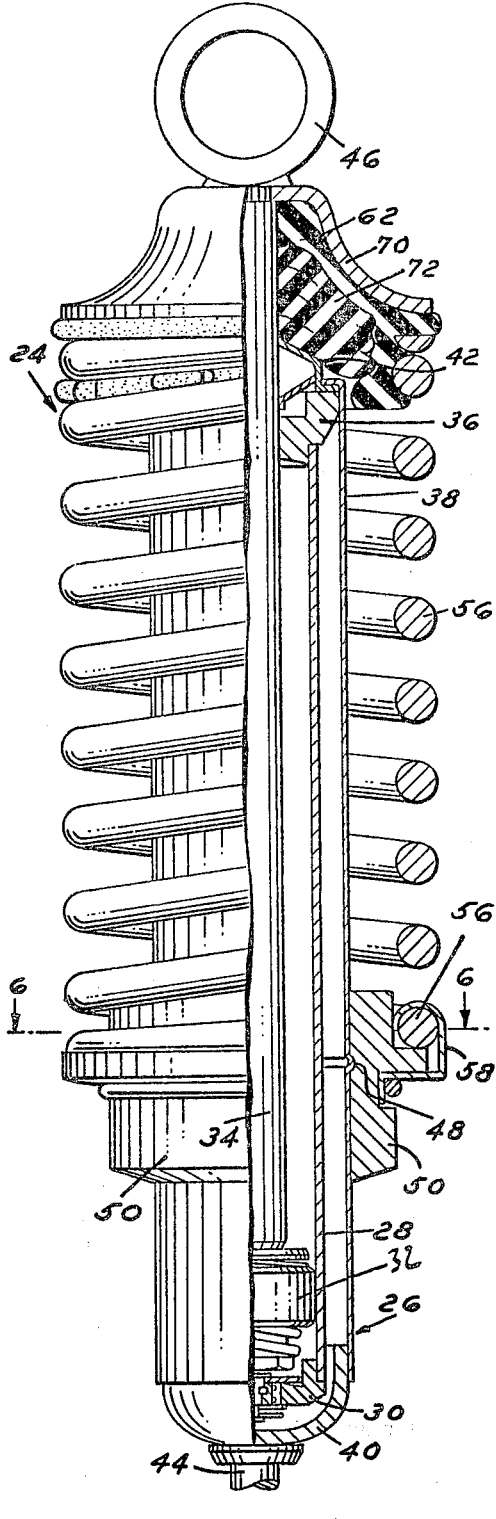
FIGURE 4 is an elevational view, partly in section, of the unit of FIGURE 2 with the components shown in an extreme jounce position.
Figure 6:
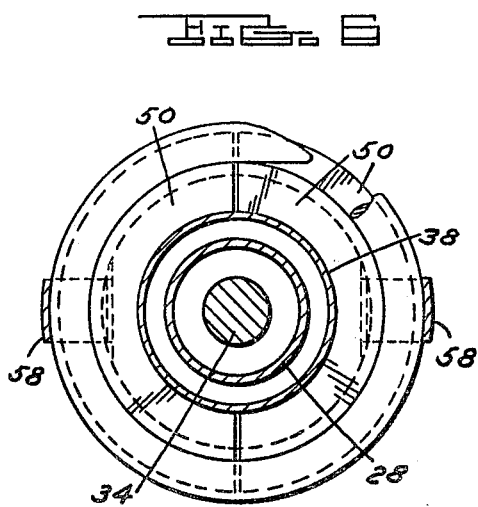
FIGURE 6 is a sectional view taken along section lines 6—6 of FIGURE 4.

FIGURE 4 discloses the various components of the unit 24 when in a full jounce position. Under these conditions, the retainer 62 is in engagement with the stop member 70 causing the spring 56 to carry a large portion of the sprung vehicle weight.

By rigidly securing the lower end of the coil spring 56 to the shock absorber tube 38, there is less tendency for it to buckle as compared with designs wherein the lower end of the coil spring is merely seated on a support member.

A rubber corrugated spring 72 may also be provided. A spring of this type is shown in Patent No. 168,845. This spring comes into operation only during extreme jounce deflection such as shown in FIGURE 4. That figure discloses the manner in which the spring 72 is distorted. It has a sliding fit on the rod 34.

The suspension unit 24 has several distinct advantages. Because the spring 56 only comes into play during jounce below design height, no excess forces are present during the rebound stroke. When a unit 24 of the type described above is installed in a vehicle to accommodate extra loads, the vehicle will not have an extreme riding height when the vehicle is unloaded.

The unit 24 provides a three-stage effect. This can be appreciated upon consideration of its operation during a jounce stroke beginning from the full rebound position shown in FIGURE 3. As piston 32 moves in jounce toward the position shown in FIGURE 2, the regular vehicle spring 16 provides resilient resistance. At this point retainer 62 strikes the stop member 70 and the coil spring 56 begins to exert its effect in resisting further jounce movement. The third stage begins if the forces are sufficient to deform the rubber spring 72 trapped between the retainer 62 and the closure member 42 of the tube 38.

According to conventional practice, the valving of the foot valve 30 and piston 32 is designed to provide the damping characteristics dictated by the main suspension spring 16 and the supplemental springs 56 and 72.

The term "design height" when used in this specification refers to the position and attitude of the vehicle body relative to the ground and thus the relative positions of the sprung components, the unsprung components and the connecting suspension system when the vehicle is loaded with an arbitrary [average] load selected by the automotive designer such as five passengers weighing 150 pounds each.

Modifications and alterations of this invention may occur to those skilled in the art that will come within the scope and spirit of the following claims.

I claim:

1. A vehicle suspension system having sprung and unsprung parts, a suspension spring interposed between said parts and constructed for resiliently supporting said sprung parts on said unsprung parts, a direct acting telescopic shock absorber interposed between said parts, said shock absorber having a body portion connected to one of said parts and a piston rod portion connected to the other of said parts, a spring seat secured to said body portion, a coil spring disposed concentrically about said body portion and having one end secured to said spring seat, a cup-shaped rubber retaining member connected to the other end of said coil spring and slidably receiving said piston rod portion, a rubber spring surrounding said piston rod portion and situated within said coil spring between said retaining member and said body portion, a stop member secured to the end of said piston rod portion, said stop member being spaced apart from said retaining member when said shock absorber is in an extended rebound position but engaging said retaining member when in a jounce position.

2. For a vehicle suspension system having sprung and unsprung parts with a suspension spring interposed between said parts and constructed for resiliently supporting said sprung parts on said unsprung parts, a direct acting telescopic shock absorber adapted to be interposed between said parts, said shock absorber having a body portion and a piston rod portion, a spring seat secured to said body portion, a coil spring disposed concentrically about said body portion and having one end secured to said spring seat, a cup-shaped rubber retaining member connected to the other end of said coil spring and slidably receiving said piston rod portion, a stop member secured to said piston rod portion, said stop member being spaced apart from said retaining member when said shock absorber is in an extended rebound position, said retaining member having a convex exterior surface directed toward said stop member.

3. For a vehicle suspension system having sprung and unsprung parts with a suspension spring interposed between said parts and constructed for resiliently supporting said sprung parts on said unsprung parts, a direct acting telescopic shock absorber adapted to be interposed between said parts, said shock absorber having a body portion and a piston rod portion, a spring seat secured to said body portion, a coil spring disposed concentrically about said body portion and having one end connected to said spring seat, a retaining member secured to said coil spring and slidably receiving said piston rod portion, a stop member secured to the end of said piston rod portion, said stop member being spaced apart from retaining member when said shock absorber is in an extended rebound position, said retaining member being constructed to position said coil spring concentrically with respect to said piston rod during rebound movement.

4. A suspension device comprising a direct acting telescopic shock absorber having a body portion and a piston rod portion, said piston rod portion being movable between jounce and rebound positions, a spring disposed concentrically about said body portion and having one end secured thereto, a rubber member slidably engaging said piston rod portion, said rubber member positioning the other end of said spring concentrically with respect to said piston rod portion, a stop member secured to said rod portion and constructed to be engaged by said rubber member during extreme jounce movement of said rod portion with respect to said body portion whereby said spring resiliently resists said extreme jounce movement.

(References on following page)

References Cited by the Examiner

UNITED STATES PATENTS

| | | | |
|---|---|---|---|
| 1,714,646 | 5/1929 | Thomann | 267—8 |
| 1,990,033 | 2/1935 | Johnson | 267—64 |
| 2,077,935 | 4/1937 | Johnson | 267—64 |
| 2,981,534 | 4/1961 | Peras | 267—8 |
| 3,096,084 | 7/1963 | Osterhoudt | 267—8 |
| 3,111,201 | 11/1963 | Bliven et al. | 267—8 |

FOREIGN PATENTS

| | | |
|---|---|---|
| 899,650 | 6/1962 | Great Britain. |
| 316,910 | 4/1934 | Italy. |

ARTHUR L. LA POINT, *Primary Examiner.*

EUGENE G. BOTZ, *Examiner.*

W. B. WILBER, *Assistant Examiner.*